US012061113B1

(12) United States Patent
Tan et al.

(10) Patent No.: US 12,061,113 B1
(45) Date of Patent: Aug. 13, 2024

(54) INTELLIGENT FREQUENCY READING METHOD APPLICABLE TO LOW-TEMPERATURE ENVIRONMENT AND WIRELESS VIBRATING WIRE ACQUISITION INSTRUMENT

(71) Applicant: Institute of Rock and Soil Mechanics, Chinese Academy of Sciences, Wuhan (CN)

(72) Inventors: Xianjun Tan, Wuhan (CN); Weizhong Chen, Wuhan (CN); Hongdan Yu, Wuhan (CN); Hongming Tian, Wuhan (CN); Jingqiang Yuan, Wuhan (CN); Wusheng Zhao, Wuhan (CN); Peichao Zheng, Wuhan (CN)

(73) Assignee: Institute of Rock and Soil Mechanics, Chinese Academy of Sciences, Xianjun TAN (CN)

( * ) Notice: Subject to any disclaimer, the term of this patent is extended or adjusted under 35 U.S.C. 154(b) by 0 days.

(21) Appl. No.: 18/648,321

(22) Filed: Apr. 26, 2024

(30) Foreign Application Priority Data

Apr. 27, 2023 (CN) .......................... 202310469612.4

(51) Int. Cl.
*G01H 17/00* (2006.01)
(52) U.S. Cl.
CPC .................................. *G01H 17/00* (2013.01)

(58) Field of Classification Search
CPC ........ G01H 17/00; G01H 11/06; G01H 13/00; G01H 9/00; G01H 11/00; G01D 5/12; G05B 2219/37434
See application file for complete search history.

(56) References Cited

FOREIGN PATENT DOCUMENTS

| CN | 109506716 A | 3/2019 |
|---|---|---|
| CN | 110702150 A | 1/2020 |
| CN | 113899388 A | 1/2022 |

*Primary Examiner* — Tarun Sinha
(74) *Attorney, Agent, or Firm* — Nitin Kaushik

(57) ABSTRACT

The present application discloses an intelligent frequency reading method applicable to a low-temperature environment and a wireless vibrating wire acquisition instrument. The intelligent frequency reading method includes the following steps: frequency pre-sweeping excitation: performing frequency pre-sweeping on a vibrating wire sensor by using the wireless vibrating wire acquisition instrument, if acquisition is successful, recording an acquisition frequency, and if the acquisition is not successful, entering frequency re-sweeping excitation, wherein the frequency re-sweeping excitation includes the following steps: primary voltage regulation: if the acquisition is not successful by the frequency pre-sweeping excitation, performing primary voltage regulation, increasing an excitation voltage until excitation is successful, and recording an excitation success voltage value; if the excitation is not successful by the primary voltage regulation, performing secondary voltage regulation, increasing the excitation voltage until the excitation is successful, and recording the excitation success voltage value.

6 Claims, 1 Drawing Sheet

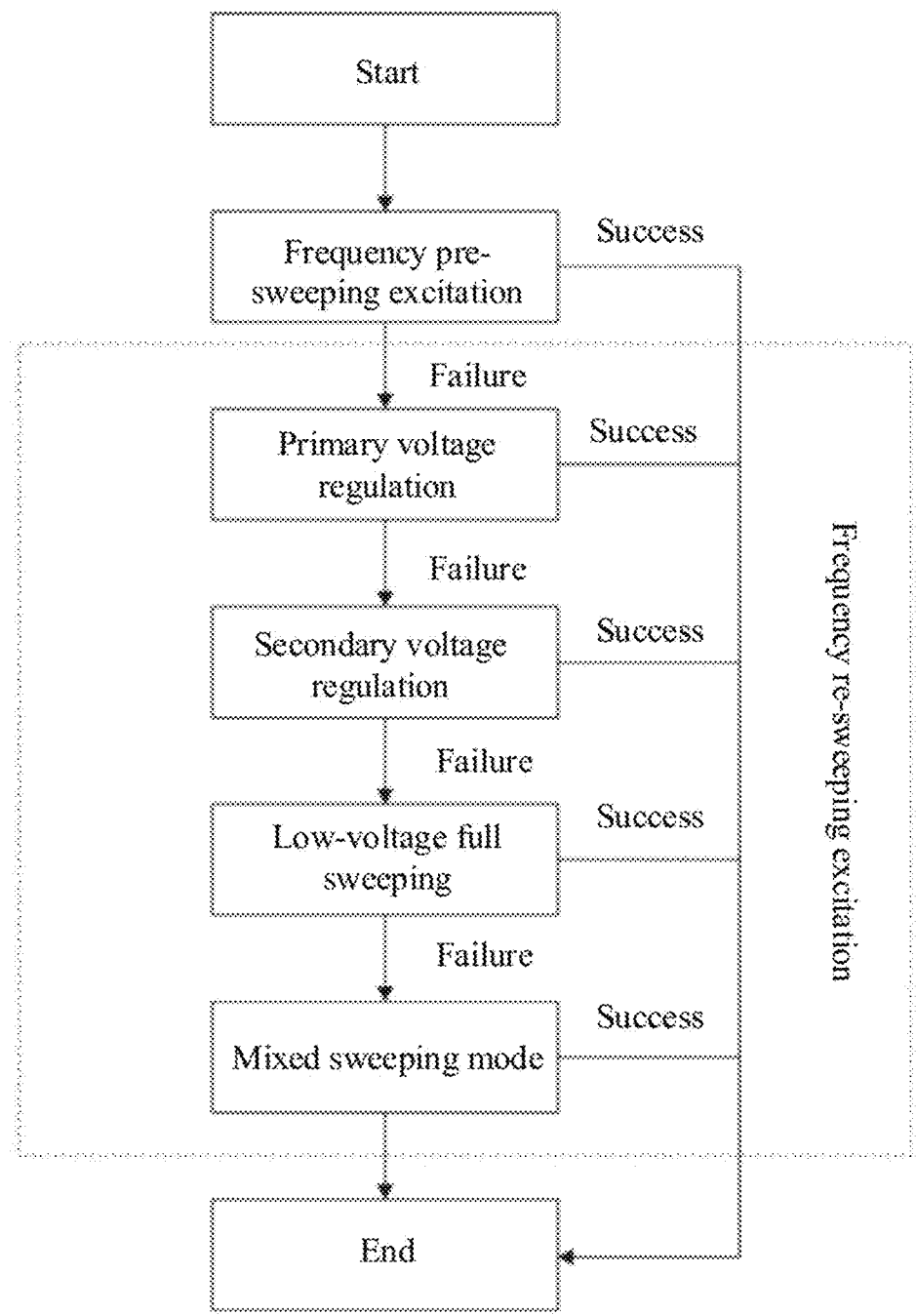

INTELLIGENT FREQUENCY READING METHOD APPLICABLE TO LOW-TEMPERATURE ENVIRONMENT AND WIRELESS VIBRATING WIRE ACQUISITION INSTRUMENT

CROSS-REFERENCE TO RELATED APPLICATIONS

The application claims priority to Chinese patent application No. 2023104696124, filed on Apr. 27, 2023, the entire contents of which are incorporated herein by reference.

TECHNICAL FIELD

The present application relates to the technical field of civil engineering testing, and more particularly relates to an intelligent frequency reading method applicable to a low-temperature environment and a wireless vibrating wire acquisition instrument.

BACKGROUND

In the field of civil engineering testing, under the extremely cold conditions, an engineer needs to periodically test data of a vibrating wire sensor embedded inside civil engineering, and needs to remotely transmit the data back to a monitoring center. A vibrating wire acquisition instrument is needed for data transmission of the vibrating wire sensor, and a conventional vibrating wire acquisition instrument has a working temperature of −20° C. to 80° ° C., so that the vibrating wire acquisition instrument cannot be normally used in an extremely cold environment.

In addition, due to different qualities of steel wires of manufacturers, the current domestic and foreign vibrating wire sensors have different requirements for excitation voltages. The steel wires of high-end vibrating wire sensor may be excited to measure data by excitation voltages of 2 V and 5 V, and the steel wires of low-end vibrating wire sensors may be excited to measure data by excitation voltages of 12 V, 24 V, and 36 V or even higher excitation voltages, resulting in that the vibrating wire acquisition instrument cannot read measured data of the vibrating wire sensors with different excitation voltages, or operation may be performed only by a number of settings and intervention of professional acquisition instrument technical personnel. As a result, the working efficiency of engineering project implementation is reduced.

SUMMARY

In order to solve the above problems, an example of the present application provides an intelligent frequency reading method applicable to a low-temperature environment and a wireless vibrating wire acquisition instrument. By utilizing the intelligent frequency reading method of the present application, measured data of vibrating wire sensors with different excitation voltages may be commonly read. The technical solution is as follows:

A first aspect of the present application provides an intelligent frequency reading method applicable to a low-temperature environment, including the following steps: frequency pre-sweeping excitation: performing frequency pre-sweeping on a vibrating wire sensor by using a wireless vibrating wire acquisition instrument, if acquisition is successful, recording an acquisition frequency, and if the acquisition is not successful, entering frequency re-sweeping excitation, wherein the frequency re-sweeping excitation includes the following steps: primary voltage regulation: if the acquisition is not successful by the frequency pre-sweeping excitation, performing primary voltage regulation, increasing an excitation voltage until excitation is successful, and recording an excitation success voltage value; secondary voltage regulation: if the excitation is not successful by the primary voltage regulation, performing secondary voltage regulation, increasing the excitation voltage until the excitation is successful, and recording the excitation success voltage value; low-voltage full sweeping: if the excitation is not successful by the secondary voltage regulation, performing low-voltage full sweeping; if the acquisition is successful, memorizing an acquisition mode as a low-voltage mode, and recording an acquisition frequency; and mixed sweeping mode: if the acquisition is not successful by the low-voltage full sweeping, firstly performing high-voltage excitation and then performing full-frequency sweeping in a mixed sweeping mode, if the acquisition is successful, memorizing the acquisition mode as the mixed sweeping mode, and recording the acquisition frequency.

For example, in an intelligent frequency reading method applicable to a low-temperature environment provided by an example, limited voltage values of the excitation voltages in the primary voltage regulation, the secondary voltage regulation and the mixed sweeping mode are 110 V.

For example, in an intelligent frequency reading method applicable to a low-temperature environment provided by an example, the low-voltage full sweeping has a frequency range of 400 hz to 6,000 hz.

For example, in an intelligent frequency reading method applicable to a low-temperature environment provided by an example, during the frequency pre-sweeping excitation and the frequency re-sweeping excitation, when a certain number of waveforms with equal frequencies are acquired, the excitation is considered to be successful.

A second aspect of the present application provides a wireless vibrating wire acquisition instrument, including a memory and a processor, wherein the processor is configured to implement the intelligent frequency reading method applicable to a low-temperature environment as described above when executing a computer program stored in the memory.

For example, in a wireless vibrating wire acquisition instrument provided by an example, a circuit component of the wireless vibrating wire acquisition instrument has a working temperature range of −40° ° C. to 80° C.

For example, in a wireless vibrating wire acquisition instrument provided by an example, the wireless vibrating wire acquisition instrument is a 4G wireless vibrating wire acquisition instrument.

The intelligent frequency reading method applicable to a low-temperature environment and the wireless vibrating wire acquisition instrument provided by some examples of the present application have the following beneficial effects: by utilizing the intelligent frequency reading method of the present application, measured data of vibrating wire sensors with different excitation voltages may be commonly read, and operation may be performed without intervention of professional acquisition instrument technical personnel, thereby greatly improving the working efficiency of scientific research projects and practical engineering project implementation. Moreover, the wireless vibrating wire acquisition instrument of the present application may be adapted to the working temperature range of −40° C. to 80° C., and may acquire data of the vibrating wire sensors under the extreme temperature conditions such as a frozen soil environment, so as to meet the requirements for civil engineering periodic testing.

BRIEF DESCRIPTION OF DRAWINGS

In order to explain the technical solutions in examples of the specification or in the prior art more clearly, a brief introduction will be given to accompanying drawings to be used in the examples. Obviously, the accompanying drawings in the following description are merely some examples of the present application, and for those of ordinary skill in the art, other accompanying drawings may be obtained according to these accompanying drawings without involving any inventive effort.

The FIGURE is a flowchart of an intelligent frequency reading method applicable to a low-temperature environment of the present application.

DETAILED DESCRIPTION OF THE EMBODIMENTS

The technical solutions in examples of the present application will now be described clearly and completely with reference to the accompanying drawings in the examples of the present application. Obviously, the examples described are merely some, but not all examples of the present application. Based on the examples in the present application, all other examples obtained by those of ordinary skill in the art without involving any inventive effort shall fall within the protection scope of the present application.

Unless defined otherwise, technical or scientific terms used in the present disclosure shall have the ordinary meanings as understood by those of ordinary skill in the art to which the present disclosure belongs. The use of "first", "second", and similar terms in the present disclosure does not denote any order, quantity, or importance, but rather serves to distinguish between different components. The word "comprising" or "including", and the like, means that elements or items preceding the word encompass the elements or items listed after the word and equivalents thereof, but do not exclude other elements or items. "Connecting" or "connected", and similar terms are not limited to physical or mechanical connection, but may include electrical connection, regardless of direct or indirect connection. "Up", "down", "left", "right", and the like, are only used to indicate a relative positional relationship which may change accordingly when an absolute position of the object described changes.

A first aspect of the present application provides an intelligent frequency reading method applicable to a low-temperature environment, as shown in the FIGURE, including the following steps:

frequency pre-sweeping excitation: performing frequency pre-sweeping on a vibrating wire sensor by using a wireless vibrating wire acquisition instrument, dynamically regulating an excitation voltage according to a vibration starting condition of the vibrating wire sensor, if acquisition is successful, recording an acquisition frequency, and if the acquisition is not successful, entering frequency re-sweeping excitation, wherein the frequency re-sweeping excitation includes the following steps:

primary voltage regulation: if the acquisition is not successful by the frequency pre-sweeping excitation, performing primary voltage regulation, increasing the excitation voltage until excitation is successful and recording an excitation success voltage value, and directly adopting the voltage value in subsequent acquisition cycles;

secondary voltage regulation: if the excitation is not successful by the primary voltage regulation, performing secondary voltage regulation, increasing the excitation voltage until the excitation is successful and recording the excitation success voltage value, and directly adopting the voltage value in subsequent acquisition cycles;

low-voltage full sweeping: if the excitation is not successful by the secondary voltage regulation, performing low-voltage full sweeping with a range of 400 hz to 6,000 hz; if the acquisition is successful, memorizing an acquisition mode as a low-voltage mode and recording an acquisition frequency, and directly adopting the voltage value in subsequent acquisition cycles; and mixed sweeping mode: if the acquisition is not successful by the low-voltage full sweeping, firstly performing high-voltage excitation and then performing full-frequency sweeping in a mixed sweeping mode, if the acquisition is successful, memorizing the acquisition mode as the mixed sweeping mode and recording the acquisition frequency, and directly adopting the voltage value in subsequent acquisition cycles.

According to the above examples, by utilizing the intelligent frequency reading method of the present application, measured data of vibrating wire sensors with different excitation voltages may be commonly read, the intelligent frequency reading method is applicable to the vibrating wire sensors with various excitation voltages, and operation may be performed without intervention of professional acquisition instrument technical personnel, thereby greatly improving the working efficiency of scientific research projects and practical engineering project implementation. Moreover, the wireless vibrating wire acquisition instrument of the present application may be adapted to the working temperature range of −40° C. to 80° C., and may acquire data of the vibrating wire sensors under the extreme temperature conditions such as a frozen soil environment, so as to meet the requirements for civil engineering periodic testing.

For example, in an intelligent frequency reading method applicable to a low-temperature environment provided by an example, limited voltage values of the excitation voltages in the primary voltage regulation, the secondary voltage regulation and the mixed sweeping mode are 110 V, and the excitation automatically stops when the excitation voltage is increased to 110 V.

For example, in an intelligent frequency reading method applicable to a low-temperature environment provided by an example, the low-voltage full sweeping has a frequency range of 400 hz to 6,000 hz.

For example, in an intelligent frequency reading method applicable to a low-temperature environment provided by an example, during the frequency pre-sweeping excitation and the frequency re-sweeping excitation, when a certain number of waveforms with equal frequencies are acquired, the excitation is considered to be successful.

A second aspect of the present application provides a wireless vibrating wire acquisition instrument, including a memory and a processor, wherein the processor is configured to implement the intelligent frequency reading method applicable to a low-temperature environment as described above when executing a computer program stored in the memory.

For example, in a wireless vibrating wire acquisition instrument provided by an example, a circuit component of the wireless vibrating wire acquisition instrument has a working temperature range of −40° C. to 80° C.

For example, in a wireless vibrating wire acquisition instrument provided by an example, the wireless vibrating wire acquisition instrument is a 4G wireless vibrating wire acquisition instrument.

Although the embodiments of the present application have been disclosed above, it is not intended to be limited only to the applications set forth in the specification and the embodiments, but it is intended to be applicable to various fields that are suitable for the present application. Additional modifications may be readily made by those of ordinary skill in the art, and the present application is not limited to the specific details and illustrations shown and described herein, without departing from the general concept as defined by the claims and the equivalents thereof.

What is claimed is:

1. An intelligent frequency reading method configured to read measured data of a vibrating wire sensor comprising the following steps:
    frequency pre-sweeping excitation: performing frequency pre-sweeping on the vibrating wire sensor by using a wireless vibrating wire acquisition instrument, if acquisition is successful, recording an acquisition frequency, and if the acquisition is not successful, entering frequency re-sweeping excitation;
    wherein the frequency re-sweeping excitation comprises the following steps:
    primary voltage regulation: if the acquisition is not successful by the frequency pre-sweeping excitation, performing primary voltage regulation, if increasing an excitation voltage until excitation is successful, recording an excitation success voltage value; if the excitation is not successful by the primary voltage regulation, performing secondary voltage regulation;
    secondary voltage regulation: if increasing the excitation voltage until the excitation is successful, recording the excitation success voltage value; and if the excitation is not successful by secondary voltage regulation, performing low-voltage full sweeping;
    low-voltage full sweeping: if the acquisition is successful, memorizing an acquisition mode as a low-voltage mode, and recording an acquisition frequency; and if the acquisition is not successful by the low-voltage full sweeping, entering a mixed sweeping mode; and
    mixed sweeping mode: firstly performing high-voltage excitation and then performing full-frequency sweeping, if the acquisition is successful, memorizing the acquisition mode as the mixed sweeping mode, and recording the acquisition frequency;
    limited voltage values of the excitation voltages in the primary voltage regulation, the secondary voltage regulation and the mixed sweeping mode are 110 V.

2. The intelligent frequency reading method applicable to a low-temperature environment according to claim 1, wherein the low-voltage full sweeping has a frequency range of 400 hz to 6,000 hz.

3. The intelligent frequency reading method applicable to a low-temperature environment according to claim 1, wherein during the frequency pre-sweeping excitation and the frequency re-sweeping excitation, when a certain number of waveforms with equal frequencies are acquired, the excitation is considered to be successful.

4. A wireless vibrating wire acquisition instrument, comprising a memory and a processor, wherein the processor is configured to implement the intelligent frequency reading method applicable to a low-temperature environment according to claim 1 when executing a computer program stored in the memory.

5. The wireless vibrating wire acquisition instrument according to claim 4, wherein a circuit component of the wireless vibrating wire acquisition instrument has a working temperature range of −40° ° C. to 80° C.

6. The wireless vibrating wire acquisition instrument according to claim 4, wherein the wireless vibrating wire acquisition instrument is a 4G wireless vibrating wire acquisition instrument.

* * * * *